United States Patent
Su et al.

(10) Patent No.: US 7,587,135 B2
(45) Date of Patent: Sep. 8, 2009

(54) AUTO-FOCUS OPTICAL LENS MODULE

(75) Inventors: Han-Wei Su, Hsinchu Hsieh (TW); Chao-Chang Hu, Hsinchu Hsieh (TW); Sheng-Chih Shen, Hsinchu Hsieh (TW)

(73) Assignee: Industrial Technology Research Institute, Hsinchu Hsieh (TW)

( * ) Notice: Subject to any disclaimer, the term of this patent is extended or adjusted under 35 U.S.C. 154(b) by 305 days.

(21) Appl. No.: 11/609,581

(22) Filed: Dec. 12, 2006

(65) Prior Publication Data

US 2008/0085110 A1   Apr. 10, 2008

(30) Foreign Application Priority Data

Oct. 4, 2006   (TW) .............................. 95136904 A (51) Int. Cl.
G03B 3/10   (2006.01)
G02B 7/02   (2006.01)

(52) U.S. Cl. ....................... 396/133; 359/824

(58) Field of Classification Search ................. 396/133; 359/696, 824

See application file for complete search history.

(56) References Cited

U.S. PATENT DOCUMENTS

| | | | |
|---|---|---|---|
| 4,755,705 A | 7/1988 | Holum | |
| 4,786,836 A | 11/1988 | Tokushima | |
| 4,829,209 A | 5/1989 | Kawasaki et al. | |
| 4,935,659 A | 6/1990 | Naka et al. | |
| 4,952,834 A | 8/1990 | Okada | |
| 4,959,580 A | 9/1990 | Vishnevskey et al. | |
| 5,013,982 A | 5/1991 | Sasaki | |
| 5,146,071 A * | 9/1992 | Ookubo et al. | 250/201.2 |
| 5,146,129 A * | 9/1992 | Tamura et al. | 310/323.16 |
| 5,708,872 A | 1/1998 | Fukino | |
| 5,751,502 A | 5/1998 | Watanabe | |
| 5,898,526 A | 4/1999 | Yoshibe et al. | |
| 5,898,528 A | 4/1999 | Fukino | |

(Continued)

FOREIGN PATENT DOCUMENTS

JP   2003-112119   4/2003

(Continued)

OTHER PUBLICATIONS

Yang, et al. "Effects of uniaxial stress and DC bias field on the piezoelectric, dielectric, and elastic properties of piezoelectric ceramics"; IEEE Ultrasonics Symposium, Oct. 2000, vol. 2 pp. 1005-1008.*

(Continued)

*Primary Examiner*—Melissa J Koval
*Assistant Examiner*—Leon W Rhodes
(74) *Attorney, Agent, or Firm*—WPAT, P.C.; Anthony King (57) ABSTRACT

An auto-focus optical lens module is proposed, including a base body having a receiving space formed therein, a lens sleeve rotatably disposed in the receiving space, a lens screwed with the lens sleeve, and a piezoelectric element fixed in the base body for contacting and driving the lens sleeve to rotate, wherein the base body and the lens are respectively provided with a first and second guiding portions for slidably positioning, thereby driving the lens sleeve to rotate so as to enable the lens to focus. The auto-focus optical lens module has simplified elements and enhanced driving force.

24 Claims, 5 Drawing Sheets

U.S. PATENT DOCUMENTS

| | | | |
|---|---|---|---|
| 6,208,065 B1 * | 3/2001 | Ueyama | 310/328 |
| 6,545,395 B2 * | 4/2003 | Matsui et al. | 310/369 |
| 2005/0195502 A1 * | 9/2005 | Jeong et al. | 359/808 |
| 2005/0253484 A1 * | 11/2005 | Kishi et al. | 310/323.16 |
| 2005/0268499 A1 * | 12/2005 | Weinrib et al. | 37/326 |

FOREIGN PATENT DOCUMENTS

| | | |
|---|---|---|
| JP | 2003-175364 | 6/2003 |
| JP | 2003-236466 | 8/2003 |
| JP | 2004-94171 A | 3/2004 |
| JP | 2004-280031 | 10/2004 |
| JP | 2006-98587 A | 4/2006 |
| JP | 2006-197743 | 7/2006 |
| TW | M294046 | 12/1994 |

OTHER PUBLICATIONS

English translation of the Abstract of JP2004-94171A.
English translation of the Abstract of JP2006-98587A.
English translation of the Abstract of JP2006-197743.
English translation of abstract M294046.
2006101363224 Chinese Office Action dated Oct. 24, 2008.
English translation of 2006101363224.

* cited by examiner

AUTO-FOCUS OPTICAL LENS MODULE

BACKGROUND OF THE INVENTION

1. Field of the Invention

The present invention relates generally to optical lens driving techniques, and more particularly to an auto-focus optical lens module.

2. Description of Related Art

Taiwan Certificate No. M294046 discloses an auto-focus optical lens module, which comprises a bottom cover, two guiding pins, two conductive sheets, a lower frame, a lens sleeve, two springs, a lens, a coil, an upper frame, two magnets, and a top cover. The bottom cover is a rectangular frame body, which has four holders respectively disposed at four corners thereof for engaging with the top cover, a through hole formed at a central portion thereof so as to form an optical path for the lens, two fixing holes respectively disposed at two opposite corners of an inner surface of the bottom for the two guiding pins to be inserted. The two conductive sheets are both attached to the bottom cover but connected to two different electrodes. A central hole is formed between the two conductive sheets so as to form the optical path for the lens, the conductive sheets respectively have through holes allowing the corresponding guiding pins to pass through; the lower frame is disposed on the two conductive sheets, a central hole is disposed at the central position thereof for forming the optical path for the lens.

The lens sleeve comprises a ring-shaped frame having a central hole for assembly of the lens and two symmetrical protruding ears disposed at periphery of the frame. The two symmetrical protruding ears respectively have through holes formed therein for allowing the guide pins to pass through. The two springs are respectively disposed around the guiding pins, and bottom of the springs are respectively abutted against the protruding ears of the lens sleeve. The lens is fixingly disposed inside the central hole of the lens sleeve. The coil is disposed on the ring-shaped frame of the lens sleeve, and conductive lines at front and end portions of the coil are respectively connected to the conductive sheets.

The upper frame comprises a ring-shaped frame and two engaging bodies disposed at the periphery of the frame. By engaging the two engaging bodies with the lens sleeve, a lens sleeve group consisting of the upper frame, the coil, and the lens sleeve disposed at the periphery of the lens can be formed with the coil fixingly disposed between the ring-shaped upper frame and the corresponding ring-shaped frame of the lens sleeve. The two magnets are two symmetrical arc-shaped magnets, respectively disposed at left and right outer sides of the coil. By engaging the top cover with the bottom cover, a lens module is formed, wherein the two magnets are fixingly disposed between the top cover and the bottom frame, the two springs are respectively suppressed upward against the inner surface of the top cover and thereby disposed between the inner surface of the top cover and the protruding ears of the lens sleeve. Driven by the electromagnetic force generated by the interaction between the coil and the magnets, the lens sleeve module can be axially moved. As the two springs are respectively disposed around the guiding pins and elastically disposed between the lens sleeve module and the inner surface of the top cover, the lens sleeve module can be stably moved.

Although the above-described lens module has the function of auto-focus through the electromagnetic force, the module structure is rather complex. Also, the volume of the module structure is rather large limited by volumes of the coil and the magnets. Therefore, the abovementioned invention can only be used in conventional cameras and large-sized digital cameras, which is difficult to be applied in thin digital cameras and handheld electronic devices having camera function.

Japanese Unexamined Patent Publication No. 2003-236466, No. 2003-175364, No. 2003-112119, and No. 2004-280031 disclose various kinds of electromagnetic actuators that can be applied in different products, a common characteristic among which is a leaf spring is used to provide a suspension effect for the driven object. However, deformation range of the leaf spring limits the design solution, that is, the driving distance is limited by size of the leaf spring. In addition, the use of the leaf spring also leads to big volume of the products. With the increase of size of the leaf spring for increasing the driving distance, the volume of the whole actuator is also increased, thereby making it impossible to miniaturize the actuator. Meanwhile, spring fatigue and deformation precision of the leaf spring also adversely affect the possibility of the actuator miniaturization.

British 1 Ltd. Corporation (http://www.1limited.com) proposes a spirally rolling piezoelectric actuator using dual-chip type piezoelectric ceramics. The piezoelectric actuator has been used in cameras for driving the focus lens. The piezoelectric actuator in combination with the optical lens and the frame can be disposed in conventional cameras, digital cameras and mobile phones having camera function for auto-focus.

Although the spirally rolling actuator has advantages of small volume, big displacement, low power consumption, low noise and high compatibility, it needs a lot of labor for rolling the dual-chip type piezoelectric ceramics and connecting the circuits. Even if automatized mechanics and tools can be used to finish the work, the fabrication process is complex and difficult, which can result in low product yield and unstable quality, thereby limiting the large-scale application of the spirally rolling actuator in the industry.

U.S. Pat. Nos. 4,755,705, 4,786,836, 4,829,209, 4,935,659, 4,952,834, 4,959,580, 5,013,982, 5,708,872, 5,751,502, 5,898,526, and 5,898,528 disclose techniques related to application of ultrasonic motor (or called as piezoelectric motor) or piezoelectric actuator in conventional cameras. However, as digital cameras and lens of mobile phones having function of zoom or focus become popular, these above-mentioned ultrasonic motors or piezoelectric actuators are difficult to be received in these newly developed products.

In addition, some papers and research meetings disclose some digital cameras and camera phones with small volume piezoelectric optical lens. However, structure of the piezoelectric optical lens is rather complex and related components must be separately fabricated instead of being fabricated in batch-type. Meanwhile, the assembly of the piezoelectric optical lens, particular assembly of the piezoelectric stator, is quite difficult, which decreases the driving force for simple piezoelectric optical lens. Particularly, assembly of tiny components needs a lot of labor because they cannot be assembled by automatized machine, thereby increasing the labor and fabrication cost. Therefore, although the piezoelectric optical lens has advantage of small volume, the cost of it is rather high, which adversely affects the application of the piezoelectric optical lens in the industry.

Therefore, there is a need to provide a piezoelectric optical lens to solve the above problems.

SUMMARY OF THE INVENTION

According to the above drawbacks, an objective of the present invention is to provide an auto-focus optical lens module having simplified elements.

Another objective of the present invention is to provide an auto-focus optical lens module with small volume.

Still another objective of the present invention is to provide an auto-focus optical lens module having improved driving torque.

Still another objective of the present invention is to provide an auto-focus optical lens module having a firm structure.

Still another objective of the present invention is to provide an auto-focus optical lens module that is easy to be fabricated.

A further objective of the present invention is to provide an auto-focus optical lens module that is easy to be assembled.

In order to attain the above and other objectives, the present invention discloses an auto-focus optical lens module, which comprises a base body having a receiving space, an optical hole connected to the receiving space and a first guiding portion adjacent to the receiving space; a lens sleeve rotatably disposed in the receiving space away from the optical hole and having a first screwing portion; a lens disposed in the receiving space adjacent to the optical hole, the lens having a second screwing portion to be engaged with the first screwing portion of the lens sleeve and a second guiding portion to be slidably positioned to the first guiding portion of the base body, through which the lens can axially move according to the rotation of the lens sleeve; and a piezoelectric element fixed in the base body and contacting outer side of the lens sleeve for providing rotating force so as to drive the lens sleeve to rotate, thereby making the lens focus.

The axis of the piezoelectric element is parallel to that of the lens sleeve. The piezoelectric element can comprise a metallic tube and two piezoelectric ceramics. Preferably, the two piezoelectric ceramics are fixed to the outer surface of the metallic tube at an interval. The metallic tube can be made of an aluminum tube or a copper tube such as a brass tube. The metallic tube can also be replaced with a plastic tube. In addition, the piezoelectric ceramics can have a single layer structure or a multi-layer structure. Meanwhile, the piezoelectric ceramics can be polarized, electrode coated or cut according to the mode shape.

A fixing hole can be disposed in the base body adjacent to the receiving space for fixing the piezoelectric element. A pressing portion is disposed at one side of the base body for pressing the piezoelectric element so as to provide a preload for making the piezoelectric element contact the outer side of the lens sleeve. Therein, the pressing portion at least comprises a preload adjusting element such as a screw connected to one side of the base body and abutted against the outer side of the piezoelectric element. Preferably, the pressing portion further comprises a buffer element disposed between the preload adjusting element and the piezoelectric element. The buffer element can be such as a rubber pad or a spring. In a preferred embodiment, a plurality of piezoelectric elements contacting the outer side of the lens sleeve is fixed in the base body, and the piezoelectric elements are disposed to the outer side of the lens sleeve at an equal angle interval. In another preferred embodiment, a piezoelectric element and a follower rotating wheel are disposed in the base body at the outer side of the lens sleeve at fixed interval and contacting the outer side of the lens sleeve. The number of the piezoelectric element and the follower rotating wheel can be varied according to the practical need. Of course, the piezoelectric element and the follower rotating wheel can be disposed to the outer side of the lens sleeve at an equal angle interval. The base body comprises a base and a front cover.

The outer side of the lens sleeve can comprise a rubbing portion for allowing the piezoelectric element to contact and drive. Therein, the rubbing portion has a ring-shaped structure enclosing the outer side of the lens sleeve. The ring-shaped structure can be made of metal, rubber or abrasion resistance material. The first screwing portion disposed on the lens sleeve is inner thread and the second screwing portion disposed on the lens is outer thread. The first guiding portion can be a guiding rail formed in the base body, and the second guiding portion can be a frame formed at the outer side of the lens and slidably engaging with the guiding rail. A stopping structure can be disposed at the front portion of the guiding rail for limiting the displacement of the frame. In addition, a follower rotating wheel is connected to the end portion of the guiding rail for contacting the outer side of the lens sleeve. In a preferred embodiment, a lens sleeve member is fixed to the outside of the lens and the frame is formed at the outer side of the lens sleeve member.

Compared with the prior art, the auto-focus optical lens module of the present invention can drive a plurality of piezoelectric elements at the same time, thereby improving the driving torque. Meanwhile, the auto-focus optical lens module only needs to use a single piezoelectric element or a plurality of piezoelectric elements to drive the optical lens to focus. Thus, the auto-focus optical lens module has a small volume and can be easily applied in electronic devices such as mobile phones. Further, elements such as the base body, the lens, the lens sleeve and the piezoelectric element are simple. Standard elements can be used or they can be integrally fabricated. Therefore, the fabrication of the auto-focus optical lens module is facilitated and a firm structure can be obtained. As the elements all have positioning or engaging portions, assembly of the auto-focus optical lens module is convenient. Therefore, the present invention overcome the conventional drawbacks and can be conveniently applied in the industry.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

Figure 1:
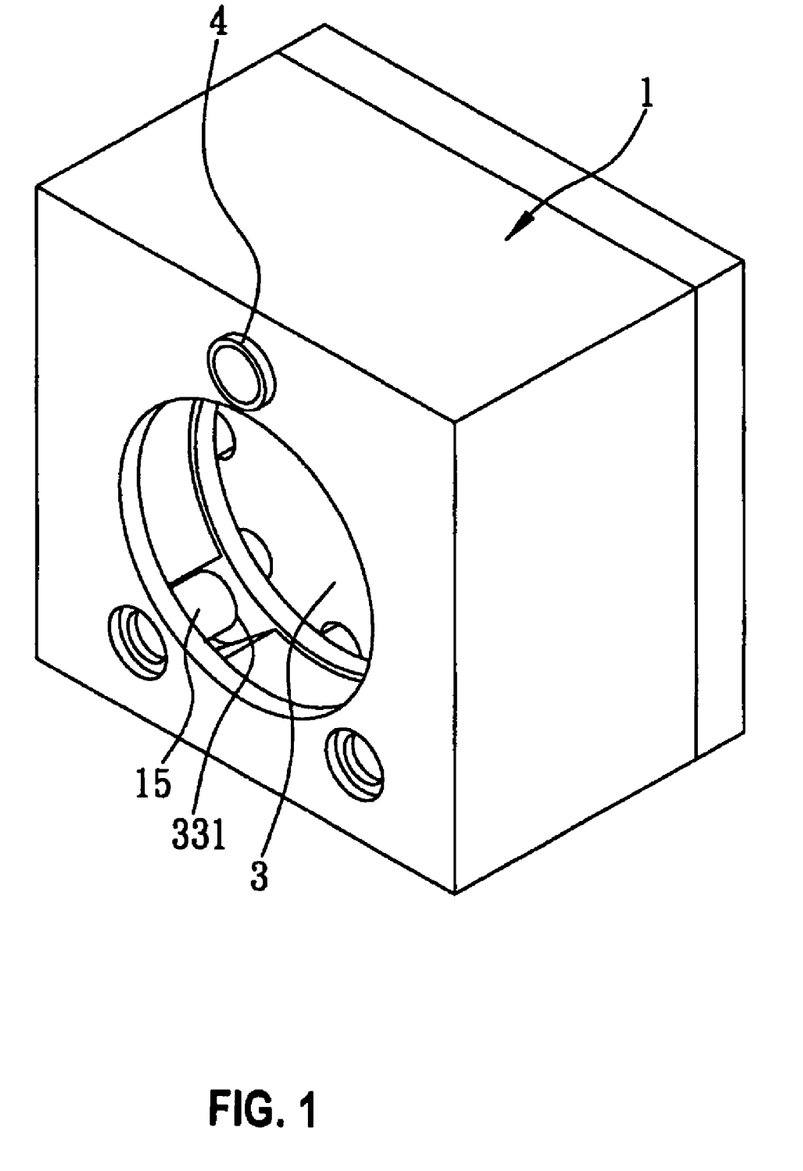
FIG. 1 is a schematic diagram of an auto-focus optical lens module of a first embodiment according to the present invention.
Figure 2:
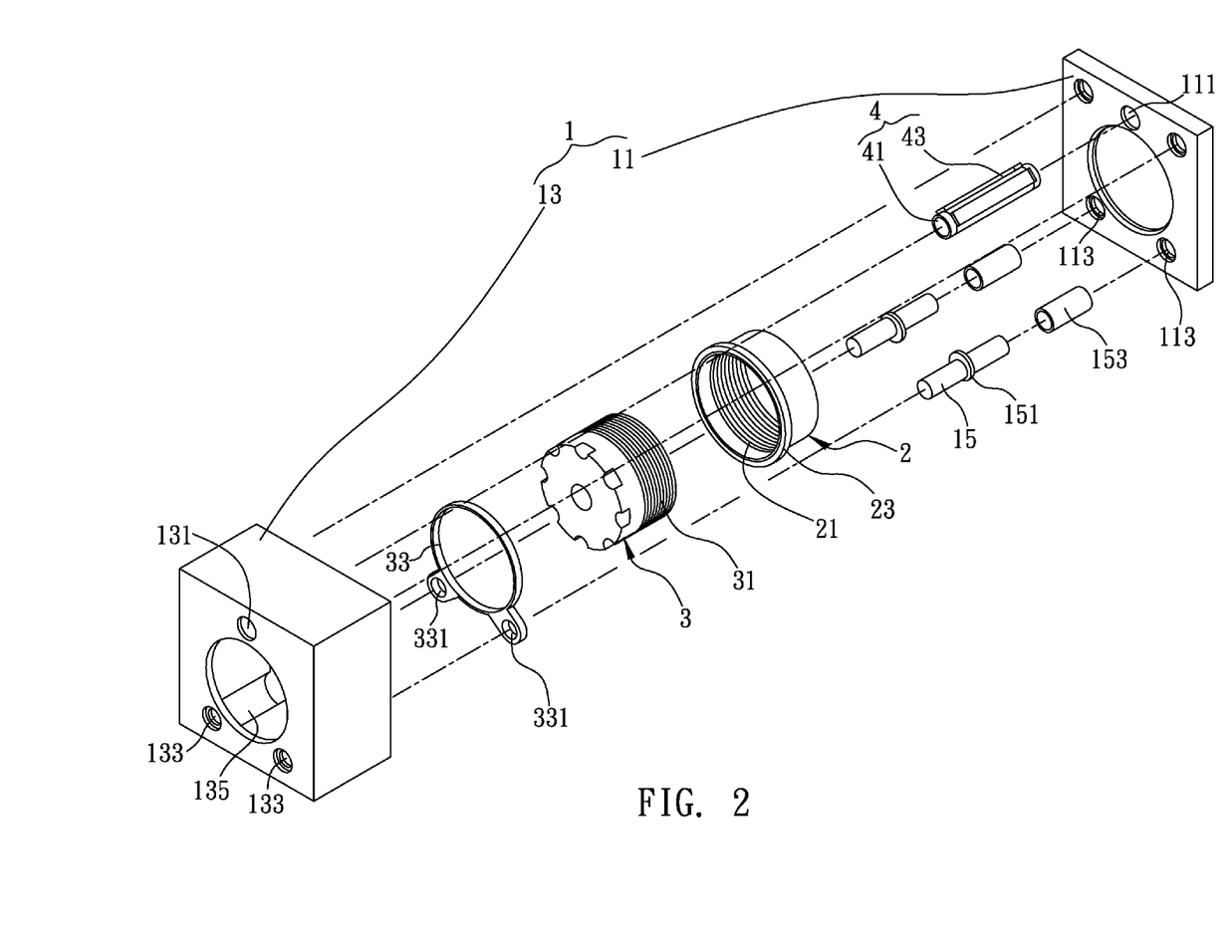
FIG. 2 is an explosive view of the auto-focus optical lens module shown in FIG. 1.

FIG. 1 is a schematic diagram of an auto-focus optical lens module of a first embodiment according to the present invention. FIG. 2 is an explosive view of the auto-focus optical lens module shown in FIG. 1. The auto-focus optical lens module comprises a base body 1 having a receiving space 9, a lens sleeve 2 rotatably positioned in the receiving space 9, a lens 3 screwed with the lens sleeve 2, and a piezoelectric element 4 fixed in the base body 1 for contacting and driving the lens sleeve 2 to rotate. The base body 1 is provided with a first guiding portion 15, and the lens 3 is provided with a second guiding portion 331 slidably positioned to the first guiding portion 15. Therefore, through the rotation of the lens sleeve 2, the lens 3 is focused. Thus, the auto-focus optical module has a simple structure and an increased driving force.

In the first embodiment, the piezoelectric element 4 has an axis parallel to that of the lens sleeve 2, for providing preferred driving efficiency, thereby ensuring maximum torque output. But it is not limited to the first embodiment. The axis of the piezoelectric element 4 can also be nonparallel to that of the lens sleeve 2, for reducing the size of the auto-focus optical lens module. The piezoelectric element 4 can be driven by a constant voltage at a single phase resonant frequency (a single frequency and a single phase) or biphase resonant frequency (a single frequency and two different phases). The constant voltage can be supplied through the connection of connecting wires or externally disposed pins depending on the design of products. As the wire connections and pin disposal are well known by those skilled in the art, detailed description of them is omitted.

The lens sleeve 2 and the lens 3 are received in the receiving space 9 of the base body 1. The piezoelectric element 4 is fixed in the base body 1, to contact and drive the lens sleeve 2 to rotate. The first guiding portion 15 is also fixed in the base body. In the first embodiment, the base body 1 comprises a base 11 and a front cover 13. Fixing holes 111 and 131 are respectively formed in the base 11 and the front cover 13 at positions adjacent to the receiving space 9 for fixture of the piezoelectric element 4 such that two ends of the piezoelectric element 4 are fixed to the fixing holes 111 and 131 respectively, so as to provide optimal fixing boundary condition for the piezoelectric element 4. Two positioning holes 113 and 133 are formed in the base 11 and the front cover 13 respectively, for positioning the first guiding portion 15. The first guiding portion 15 is a guiding rail, a front portion of which has a stopper structure 151 and an end portion of which is connected with a follower rotating wheel 153 for rotatably contacting an outer side of the lens sleeve 2.

After assembled with needed elements, the base 11 and the front cover 13 are screwed or adhered together so as to form the base body 1. It should be noted that structure of the base body is not limited to the present embodiment. Alternatively, the base body 1 can be formed by assembling a nearly U-shaped structure and a plate-shaped side cover structure together.

The lens sleeve 2 has a rubbing portion 23 at the outer side thereof for the piezoelectric element 4 to contact and drive. In the first embodiment, the rubbing portion 23 has a ring-shaped structure enclosing the outer side of the lens sleeve 2. The rubbing portion 23 is made of metal, rubber or abrasion resistance material such as a ceramic or rubber thimble. The lens sleeve 2 has a first screwing portion 21 such as an inner thread for being screwed with the lens 3. The lens sleeve 2 is disposed in the receiving space 9 of the base body 1 and can rotate through the combination of the follower rotating wheels 153 and the piezoelectric element 4. The stopper structures 151 at the front portions of the first guiding portions 15 provide a positioning effect for preventing axial motion of the lens sleeve 2.

The lens 3 has a second screwing portion 31 such as an outer thread disposed at the end portion thereof for being screwed with the lens sleeve 2. The front portion of the lens 3 has a second guiding portion 331 which can be slidably positioned by the first guiding portion 151. For example, the second guiding portion 331 can be a frame formed at periphery of the lens 3, which is slidably connected with the first guiding portion 15. The stopper structure 151 disposed at the front portion of the first guiding portion 15 such as a guiding rail is used to limit the sliding distance of the second guiding portion 331. That is, the stopper structure 151 limits the axial displacement of the lens 3. In the present embodiment, a lens sleeve member 33 is fixed at the outside of the lens 3. The second guiding portion 331 is disposed at the outer side of the lens sleeve member 33. Thus, the standardized lens 3 can be used in combination with the lens sleeve member 33, thereby eliminating the need of fabricating the lens 3 having the second guiding portion 331. Meanwhile, a channel 135 can further be disposed in the front cover 13 of the base body 1 such that the second guiding portion 331 can move in the channel 135.

Figure 3A:
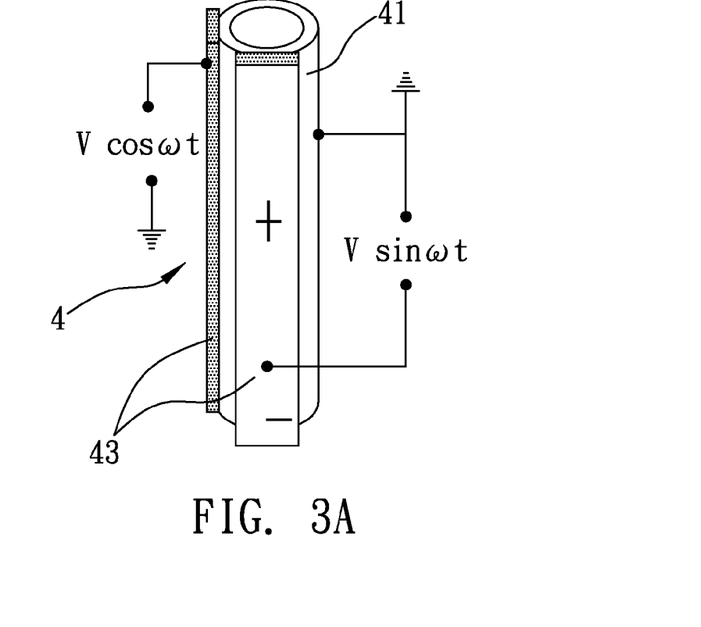
FIGS. 3A to 3D are four schematic diagrams showing four different embodiments of a piezoelectric element of the auto-focus optical lens module shown in FIG. 1.
Figure 3B:
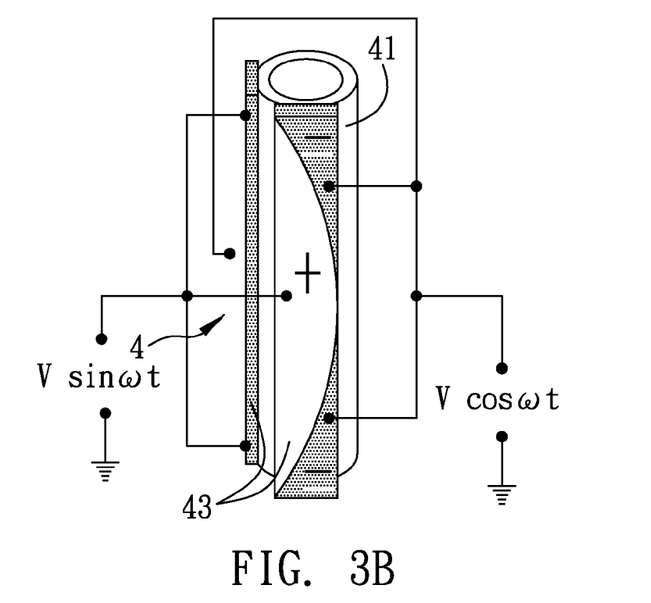
Figure 3C:
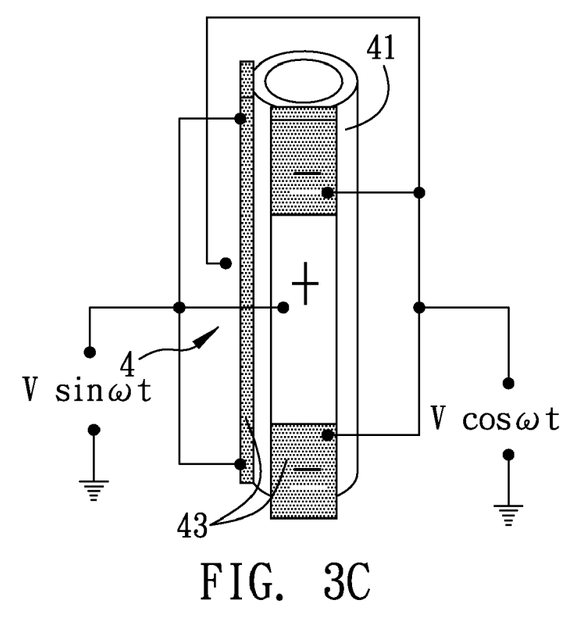
Figure 3D:
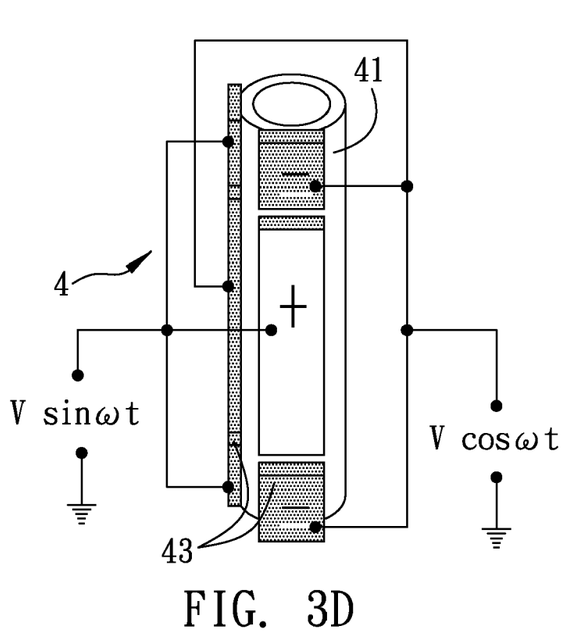

The piezoelectric element 4 is fixed to the second fixing holes 111 and 131 of the base body 1 through nodes thereof. As shown in FIG. 3A, the piezoelectric element 4 comprises a metallic tube 41 and two piezoelectric ceramics 43. Therein, the metallic tube 41 can be an aluminum tube or a copper tube such as a brass tube, but it is not limited thereto. Alternatively, a plastic tube can be used. The two piezoelectric ceramics 43 are fixed to the outer surface of the metallic tube 41 at interval. For example, they are disposed at a 90 degree angle. Meanwhile, the piezoelectric ceramics 43 can have a single layer structure or a multi-layer structure. The piezoelectric ceramics 43 can be polarized, electrode coated or cut according to the mode shape. As shown in FIG. 3B, surfaces of the piezoelectric ceramics 43 are electrode coated for optimal vibration mode. As shown in FIG. 3C, the piezoelectric ceramic sheets 43 are polarized for optimal vibration mode. As shown in FIG. 3D, an optimal vibration mode match is performed on the piezoelectric ceramics 43.

The metallic tube 41 can be connected with a negative electrode of an external electric field. The two piezoelectric ceramics 43 can be respectively connected with positive electrodes of two groups of external electrical field. If an external voltage is applied to one of the piezoelectric ceramics 43, the piezoelectric element 4 will generate a mechanical energy which drives the piezoelectric element 4 to swing at a high frequency due to an inverse piezoelectric effect, and rotates, as a HULA HOOP®, anti-clockwise along a circle, thereby transforming the electrical energy to mechanical energy. On the other hand, if another external voltage having a phase different from that of the external voltage, piezoelectric element 4 will also generate the mechanical energy due to the inverse piezoelectric effect, but rotates clockwise along the circle. Further, bidirectional rotating forces can drive the lens sleeve 2 to rotate.

The driving method of the piezoelectric element 4 can be changed as described in FIGS. 3A to 3D, such as single phase single frequency driving (such as $V\sin\omega t$ or $V\cos\omega t$), single frequency biphase driving (such as $V\sin\omega t$ and $V\cos\omega t$), bifrequency single phase driving (such as $V\sin\omega_1 t$ and $V\sin\omega_2 t$ or $V\cos\omega_1 t$ and $V\cos\omega_2 t$) or bifrequency biphase driving (such as $V\sin\omega_1 t$ and $V\cos\omega_1 t$ and $\omega_1$ is not equal to $\omega_1$). Of course, square waves or sawtooth waves can also be used for driving the piezoelectric element.

As the lens sleeve 2 is rotatably positioned on the base body 2 and the lens 3 screwed to the lens sleeve 2 is prevented from rotating through slidably positioning of the first guiding portion 15 and the second guiding portion 331, combining with engagement of the first screwing portion 21 and the second screwing portion 31, the lens 3 in the lens sleeve 2 can only axially move according to the rotation of the lens sleeve 2. Thus, by applying external voltage on the piezoelectric element 4 to bring about circular motion of the lens, the rubbing phenomenon of the lens sleeve 2 can drive the lens 2 to focus.

According to the present embodiment, a piezoelectric element 4 and two follower rotating wheels 153 are disposed to the outer side of the lens sleeve 2 at equal angle interval and contacting the outer side of the lens sleeve 2, but they are not limited to the present embodiment. The follower rotating wheels 153 can also be replaced by piezoelectric elements 4 according to the driving force and speed requirement, and a plurality of piezoelectric elements 4 can be fixed in the base body 1 and contacting the outer side of the lens sleeve 2. Further, the piezoelectric elements 4 or the piezoelectric element 4 and the follower rotating wheels 153 need to be arranged around the outer side of the lens sleeve 2, which are not limited to position relationship of equal angle interval.

In addition, the piezoelectric element 4 is not limited to the metallic tube 41 and the two piezoelectric ceramics 43. For example, a conventional piezoelectric tube can be used, which comprises a tube-shaped piezoelectric ceramic body made of PZT or an electrostrictive material, and a first, second and third electrodes disposed on the outer wall of the piezoelectric ceramic body and arranged at intervals. Therein, the first electrode is connected to a negative electrode of an applied electric field and the second and third electrodes are respectively connected to positive electrodes of two other groups of applied electric fields.

Figure 4:
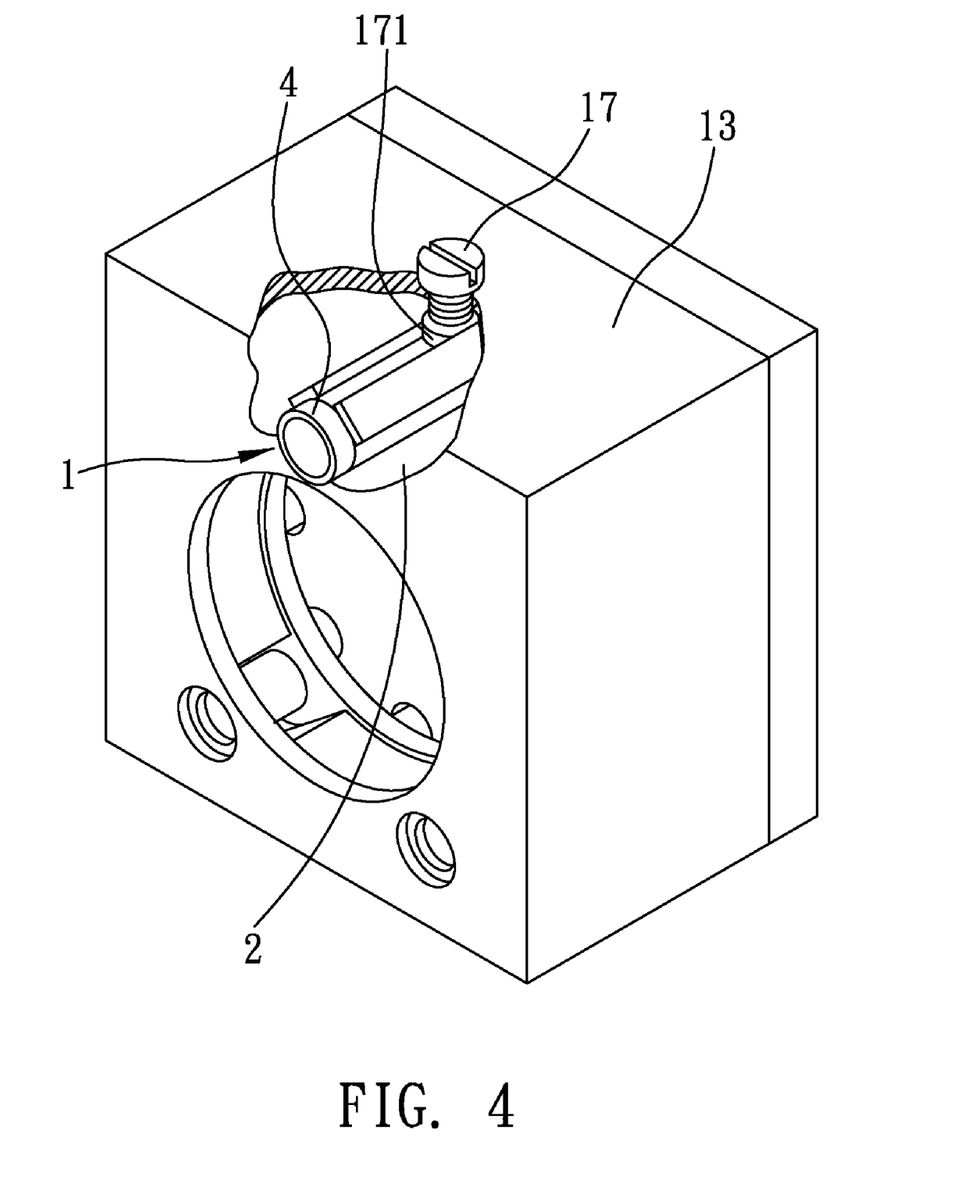
FIG. 4 is a schematic diagram of an auto-focus optical lens module of a second embodiment according to the present invention.

Referring to FIG. 4, an auto-focus optical lens module is provided. A pressing portion 17 is disposed on the front cover 13 at one side of the base body 1 for pressing the piezoelectric element 4 so as to provide a preload which makes the piezoelectric element 4 contact the outer side of the lens sleeve 2. In the present embodiment, the pressing portion 17 is a preload adjusting element such as a screw, which is connected to the front cover 13 and abutted against the outer side of the piezoelectric element 4. The term "abutted" means "connected to, with the potential for intervening layers or items". The preload of the piezoelectric element 4 contacting the outer side of the lens sleeve 2 can be adjusted through the preload adjusting element.

The pressing portion 17 can further comprise a buffer element 171 disposed between the preload adjusting element and the piezoelectric element 4 for absorbing variation of the piezoelectric element 4 in circular motion. In the present embodiment, the buffer element 171 is such as a rubber pad.

Therefore, the auto-focus optical lens module of the present invention uses a piezoelectric element to drive the optical lens, which can be received in video systems, monitor systems, optical systems, conventional cameras, digital cameras and camera phones. The auto-focus optical lens module has advantages of big torque, small volume, simple and firm structure. The auto-focus optical lens is easy to be fabricated and assembled. As a result, the conventional drawbacks are overcome.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. An auto-focus optical lens module, comprising:
   a base body having a receiving space, an optical hole connected to the receiving space, and a first guiding portion adjacent to the receiving space;
   a lens sleeve rotatably disposed in the receiving space away from the optical hole and having a first screwing portion;
   a lens disposed in the receiving space adjacent to the optical hole, the lens having a second screwing portion to be engaged with the first screwing portion of the lens sleeve, and a second guiding portion to be slidably positioned to the first guiding portion of the base body, through which the lens being able to axially move according to a rotation of the lens sleeve; and
   a piezoelectric element fixed in the base body and contacting an outer side of the lens sleeve for driving the lens sleeve to rotate relative to the lens, thereby enabling the lens to focus, wherein the piezoelectric element has an axis parallel to that of the lens sleeve.

2. The auto-focus optical lens module of claim 1, wherein the piezoelectric element comprises a metallic tube and two piezoelectric ceramics.

3. The auto-focus optical lens module of claim 2, wherein the two piezoelectric ceramics are spaced at an interval and fixed to an outer surface of the metallic tube.

4. The auto-focus optical lens module of claim 2, wherein at least one of the piezoelectric ceramics has a single-layer structure.

5. The auto-focus optical lens module of claim 2, wherein the piezoelectric ceramics are polarized, electrode coated or cut according to a mode shape.

6. The auto-focus optical lens module of claim 1, wherein the first screwing portion is an inner thread and the second screwing portion is an outer thread.

7. The auto-focus optical lens module of claim 1, wherein the outer side of the lens sleeve has a rubbing portion for allowing the piezoelectric element to contact and drive.

8. The auto-focus optical lens module of claim 7, wherein the rubbing portion has a ring-shaped structure enclosing the outer side of the lens sleeve.

9. The auto-focus optical lens module of claim 8, wherein the ring-shaped structure is made of one of the group consisting of metal, rubber and an abrasion resistance material.

10. The auto-focus optical lens module of claim 1, wherein a plurality of piezoelectric elements is fixed in the base body and contact the outer side of the lens sleeve.

11. The auto-focus optical lens module of claim 10, wherein the piezoelectric elements are disposed to the outer side of the lens sleeve at an equal angle interval.

12. The auto-focus optical lens module of claim 1, wherein the piezoelectric element and a follower rotating wheel contacting the outer side of the lens sleeve are disposed in the base body at fixed interval.

13. The auto-focus optical lens module of claim 12, wherein the piezoelectric element and the follower rotating wheel contacting the outer side of the lens sleeve are disposed at an equal angle interval.

14. The auto-focus optical lens module of claim 1, wherein the first guiding portion is a guiding rail formed in the base body, and the second guiding portion is a frame formed at an outer side of the lens and slidably engaged with the first guiding portion.

15. The auto-focus optical lens module of claim 14, wherein a stopper structure is disposed at the front portion of the guiding rail for limiting a displacement of the frame.

16. The auto-focus optical lens module of claim 15, wherein the end portion of the guiding rail is connected with a follower rotating wheel.

17. The auto-focus optical lens module of claim 14, wherein a lens sleeve member is fixed to the outside of the lens and the frame is formed at an outer side of the lens sleeve member.

18. The auto-focus optical lens module of claim 1, wherein the base body has a fixing hole adjacent to the receiving space for fixing the piezoelectric element.

19. The auto-focus optical lens module of claim 1, wherein a pressing portion is disposed at one side of the base body for pressing the piezoelectric element so as to provide a preload that makes the piezoelectric element contact the outer side of the lens sleeve.

20. The auto-focus optical lens module of claim 19, wherein the pressing portion at least comprises a preload adjusting element connected to one side of the base body and abutted against the outer side of the piezoelectric element.

21. The auto-focus optical lens module of claim 20, wherein the preload adjusting element is a screw.

22. The auto-focus optical lens module of claim 20, wherein the pressing portion further comprises a buffer element disposed between the preload adjusting element and the piezoelectric element.

23. The auto-focus optical lens module of claim 22, wherein the buffer element is either of a rubber pad and a spring.

24. The auto-focus optical lens module of claim 1, wherein the base body comprises a base and a front cover.

* * * * *